United States Patent [19]
Banan et al.

[11] Patent Number: 5,753,567
[45] Date of Patent: *May 19, 1998

[54] CLEANING OF METALLIC CONTAMINANTS FROM THE SURFACE OF POLYCRYSTALLINE SILICON WITH A HALOGEN GAS OR PLASMA

[75] Inventors: Mohsen Banan, St. Louis, Mo.; Richard L. Hansen, Cleveland, Ohio

[73] Assignee: MEMC Electronic Materials, Inc., St. Peters, Mo.

[*] Notice: The term of this patent shall not extend beyond the expiration date of Pat. No. 5,445,679.

[21] Appl. No.: 519,993

[22] Filed: Aug. 28, 1995

[51] Int. Cl.$^6$ ................................. H01L 21/302
[52] U.S. Cl. .................. 438/720; 216/75; 216/78; 134/1.1
[58] Field of Search ................. 156/643.1, 646.1, 156/662.1; 216/67, 75, 78; 134/1.1

[56] References Cited

U.S. PATENT DOCUMENTS

| | | | |
|---|---|---|---|
| 4,172,883 | 10/1979 | Ingle | 423/348 |
| 4,292,093 | 9/1981 | Ownby et al. | 148/4 |
| 4,298,423 | 11/1981 | Lindmayer | 156/616 R |
| 4,341,594 | 7/1982 | Carlson et al. | 156/646.1 |
| 4,388,286 | 6/1983 | Kapur et al. | 423/348 |
| 4,400,232 | 8/1983 | Ownby et al. | 156/601 |
| 4,462,806 | 7/1984 | Mahoney et al. | 23/293 R |
| 4,468,284 | 8/1984 | Nelson | 156/646.1 |
| 4,525,336 | 6/1985 | Griesshammer et al. | 423/348 |
| 4,529,707 | 7/1985 | Cowles et al. | 436/72 |
| 4,555,303 | 11/1985 | Legge et al. | 156/643 |
| 4,680,096 | 7/1987 | Dosaj et al. | 204/164 |
| 4,705,591 | 11/1987 | Carle et al. | 156/617 |
| 4,837,376 | 6/1989 | Schwirtlich et al. | 423/348 |
| 4,863,561 | 9/1989 | Freeman et al. | 156/646.1 |
| 4,871,416 | 10/1989 | Fukuda | 156/662.1 |
| 4,975,146 | 12/1990 | Knapp et al. | 134/1.1 |
| 4,983,254 | 1/1991 | Fujimura et al. | 156/643 |
| 5,007,981 | 4/1991 | Kawasaki et al. | 134/1.1 |
| 5,089,441 | 2/1992 | Moslehi | 437/225 |
| 5,108,543 | 4/1992 | Suzuki et al. | 156/646.1 |
| 5,126,008 | 6/1992 | Levy | 156/646.1 |
| 5,167,761 | 12/1992 | Westendorp et al. | 156/646.1 |
| 5,346,557 | 9/1994 | Ito et al. | 134/10 |
| 5,356,478 | 10/1994 | Chen et al. | 134/1.1 |
| 5,445,679 | 8/1995 | Hansen et al. | 134/1.1 |

FOREIGN PATENT DOCUMENTS

| | | |
|---|---|---|
| 5004811 | 1/1993 | Japan . |
| 6-69299 | 3/1994 | Japan . |

OTHER PUBLICATIONS

P.H. Robinson and F.P. Heiman, Journal of the Electrochemical "Use of HCl Gettering in Silicon Device Processing." Jan. 1971, pp. 141–143.

Y. Mikata et al., Proceedings–Electrochemical Society, 85-7, "Thermal Cleaning of Silicon Surface in Ultrahigh Vacuum," 1985, pp. 45–56.

Primary Examiner—R. Bruce Breneman
Assistant Examiner—Anita Alanko
Attorney, Agent, or Firm—Senniger, Powers, Leavitt & Roedel

[57] ABSTRACT

A process for removing metallic contaminants from the surface of chunk or granular polycrystalline silicon is disclosed. The metallic contaminants are exposed to a gas-phase halogen etchant which reacts with the metallic contaminants to form metal halides. The gas-phase halogen etchant is preferably a halogen plasma. The metal halides are volatilized into an atmosphere adjacent to the surface of the polycrystalline silicon, and purged therefrom. The cleaned polycrystalline silicon is used to prepare a mass of molten silicon for use in producing a single crystal silicon ingot by the Czochralski method.

30 Claims, 2 Drawing Sheets

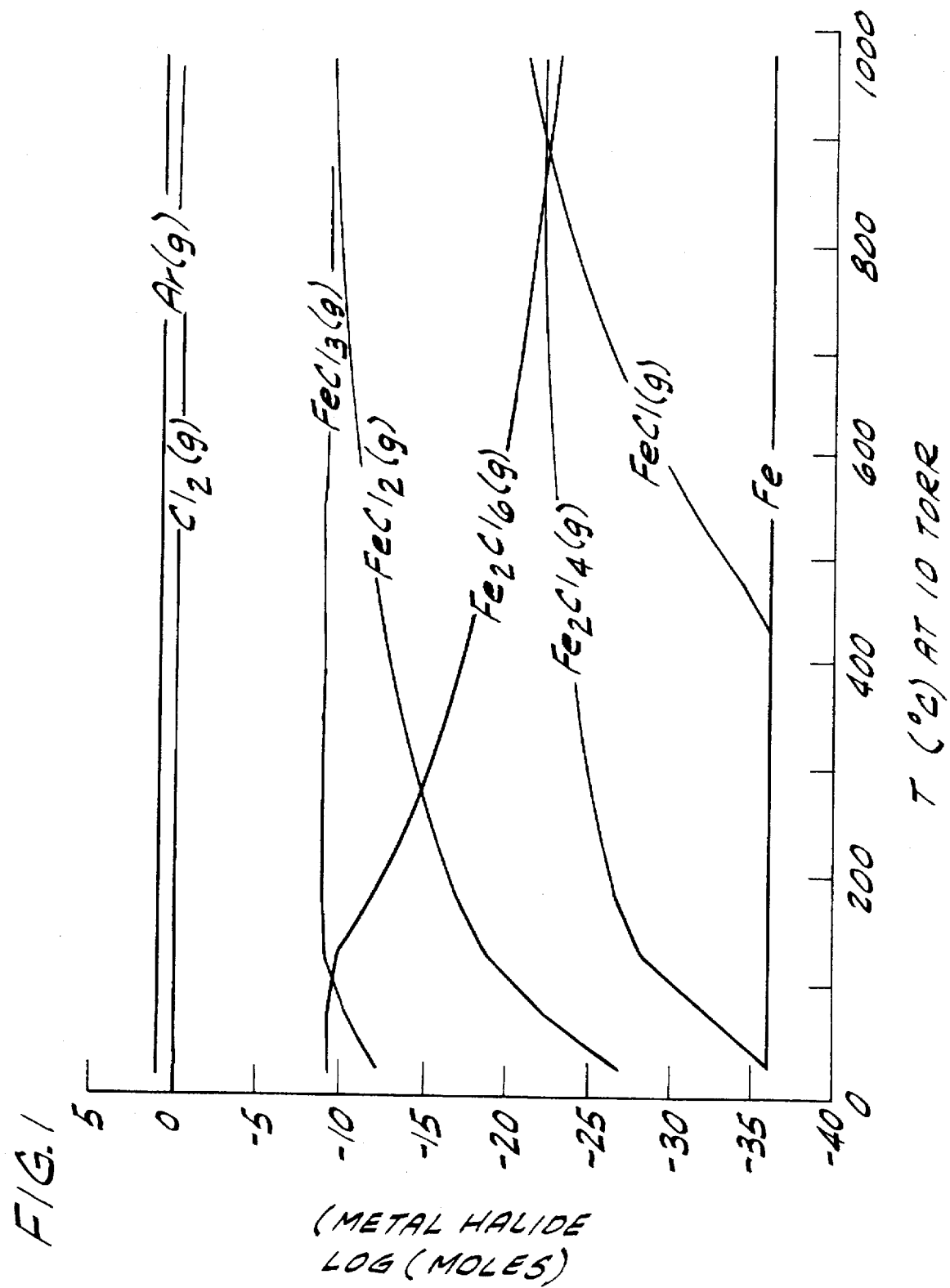

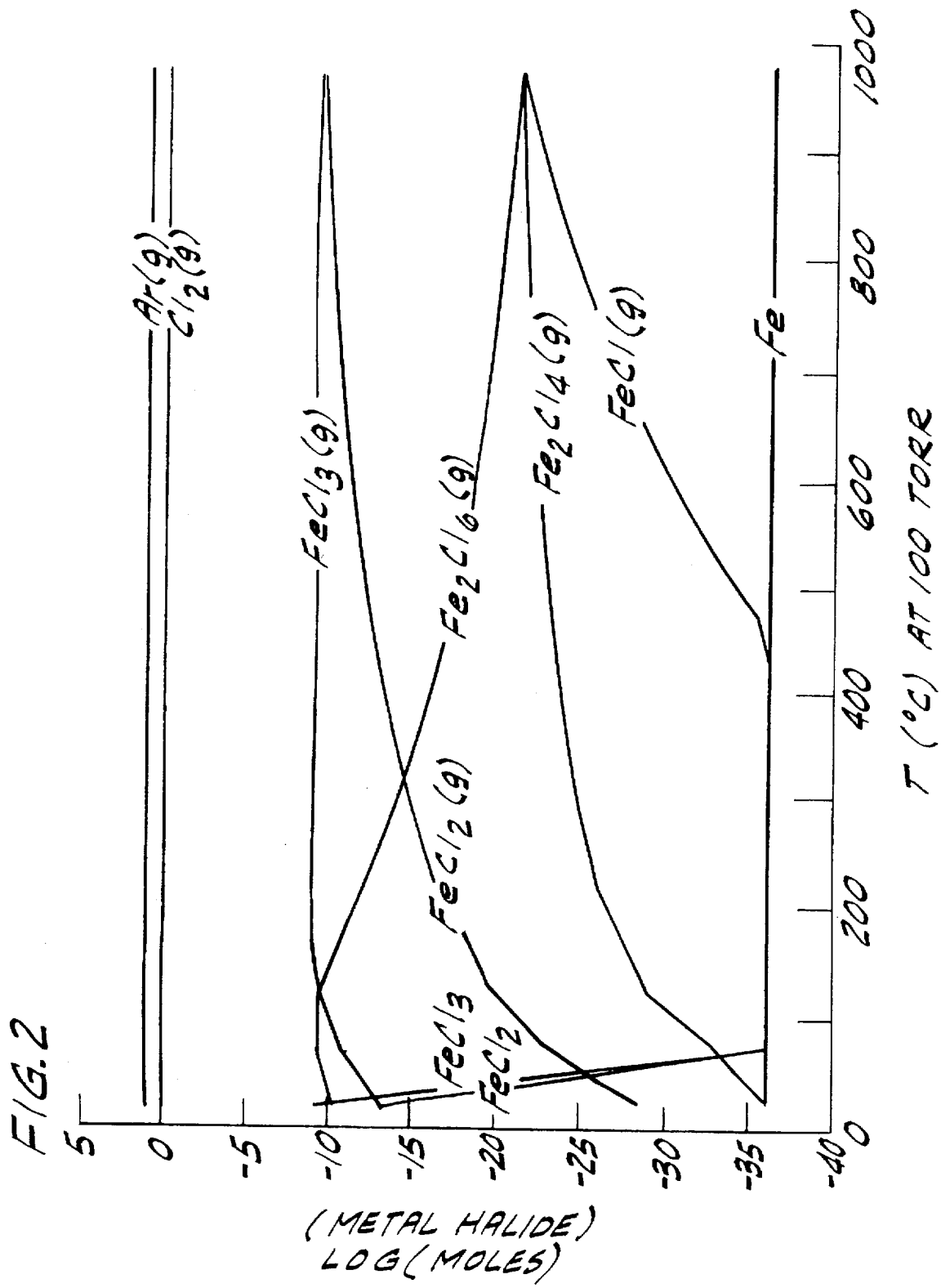

CLEANING OF METALLIC CONTAMINANTS FROM THE SURFACE OF POLYCRYSTALLINE SILICON WITH A HALOGEN GAS OR PLASMA

BACKGROUND OF THE INVENTION

The invention generally relates to a process for cleaning metallic contaminants from the surface of polycrystalline silicon, and to an improved process for preparing a mass of molten silicon from polycrystalline silicon for use in producing a single crystal silicon ingot by the Czochralski ("CZ") method. In particular, the present invention relates to a process for cleaning metallic contaminants that may be chemically bonded, chemisorbed, physisorbed, or mechanically entrapped on or near the surface of the polycrystalline silicon.

Most single crystal silicon used for microelectronic circuit fabrication is prepared by the CZ process. In this process, the single crystal silicon ingot is produced by melting polycrystalline silicon in a crucible, dipping a seed crystal into the molten silicon, withdrawing the seed crystal in a manner sufficient to achieve the diameter desired for the ingot and then growing the ingot at that diameter. During growth, the pulling rate, melt temperature, atmosphere and cooling rate are controlled in accordance with standard practice to produce a single crystal of desired characteristics.

The polycrystalline silicon has been identified as one source of metallic contaminants in single crystal silicon, and various processes have been suggested for cleaning the polycrystalline silicon before it is used in the CZ process. For example, in U.S. Pat. No. 4,525,336, Griesshammer et al. disclose a process for removing carbon and metallic contaminants from the surface of polycrystalline silicon. In this process, carbon is removed from the polycrystalline silicon by treating with an aqueous nitrate solution, annealing in the presence of air at a temperature of 900°–1300° C., cooling, etching with a hydrofluoric acid solution, and washing away the HF residue. Griesshammer et al. disclose that iron contaminants may be removed by magnetic separation and/or by chemical separation in which the iron is dissolved in hydrochloric acid, nitric acid or aqua regia. Japanese Pat. No. 5,004,811 discloses cleaning polycrystalline silicon with an aqueous mixture of hydrogen fluoride, hydrogen peroxide and water such that surface contaminants of iron, copper, nickel and chromium are reduced.

None of these wet chemistry processes are entirely satisfactory for removing metallic impurities on and near the surface of polycrystalline silicon. These methods are process intensive and limited in their effectiveness. The cleaning solution leaves a residue which must be rinsed from the polycrystalline silicon, and the rinsed polycrystalline silicon must then be dried. In addition, the extent of cleaning is limited by the initial purity of the acid and/or other solutions and by the extent to which the solution becomes contaminated with the dissolved impurities.

SUMMARY OF THE INVENTION

It is therefore an object of the invention to directly and effectively clean metallic contaminants from the surface of polycrystalline silicon chunks and granules used in the CZ process.

The present invention is directed to a process for removing metallic contaminants from the surface of chunk or granular polycrystalline silicon. The process comprises exposing the metallic contaminants to a gas-phase halogen etchant which reacts with the exposed metallic contaminants to form metal halides. The metal halides are volatilized into an atmosphere adjacent to the surface of the polycrystalline silicon, and purged therefrom.

The process preferably comprises exposing the metallic contaminants and the polycrystalline silicon to a low pressure halogen plasma in a reaction chamber. The halogen plasma is generated by energizing a source-gas which includes a halogen gas or a halogen-containing compound gas in a microwave field. The halogen plasma reacts with the exposed metallic impurities to form metal halides and etches the polycrystalline silicon until the bulk of the polycrystalline silicon is reached. The metal halides are volatilized into an atmosphere adjacent to the surface of the polycrystalline silicon. The metal halides may be volatilized in the reaction chamber or in a crystal pulller during a subsequent crystal pulling step. The volatilized metal halides are purged from the atmosphere.

The invention is also directed to a process for preparing a mass of molten silicon from polycrystalline silicon for use in producing a single crystal silicon ingot by the Czochralski method. The process comprises removing metallic contaminants from the surface of the polycrystalline silicon by exposing the metallic contaminants to a gas-phase halogen etchant which reacts with the exposed metallic contaminants to form metal halides. The metal halides are volatilized into an atmosphere adjacent to the surface of the polycrystalline silicon, and purged therefrom. This process further comprises charging the cleaned polycrystalline silicon to a crucible, and melting the cleaned polycrystalline silicon.

Use of the cleaned polycrystalline silicon for producing single crystal silicon ingots by the CZ method results in improved single crystal characteristics, including improved minority carrier lifetime, oxygen-induced stacking fault density and metal oxide silicon (MOS) device oxide-breakdown voltage. Other objects of the invention will be in part apparent and in part pointed out hereinafter.

BRIEF DESCRIPTION OF THE DRAWINGS

FIG. 1 shows equilibria data related to $FeCl_3$ and $FeCl_2$ at 10 torr (~1300 Pa).

FIG. 2 shows equilibria data related to $FeCl_3$ and $FeCl'_2$ at 100 torr (~13×10$^4$ Pa).

DETAILED DESCRIPTION

In the present invention, a gas-phase halogen etchant reacts with metallic contaminants which are bonded, chemisorbed, physisorbed, or entrapped on or near the surface of granular or chunk polycrystalline silicon to form metal halides. The gas-phase halogen etchant also etches the polycrystalline silicon.

These reactions are preferably carried out in an etching reactor which includes a reactor chamber into which the polycrystalline silicon is loaded. The reactor chamber is preferably constructed of ultra high purity fused quartz and has ports for admitting and withdrawing the gas-phase halogen etchant, product and inert gasses. The etching reactor also preferably has means for drawing a vacuum in the reactor chamber.

The reactor chamber is preferably configured such that the gas-phase halogen etchant can circulate over the entire surface of the polycrystalline silicon. One such configuration includes a sample holder inside the chamber which has a sufficient number of small diameter apertures to allow the plasma to circulate over the entire surface of the polycrystalline silicon. Such a sample holder is preferably suspended in the center of the reactor chamber to maximize circulation. Alternatively, the polycrystalline silicon may be rotated or turned-over (depending upon the geometry of the polycrystalline silicon) and exposed to the gas-phase halogen etchant as many times as necessary to facilitate thorough cleaning of all surfaces. In either case, the sample holder is preferably made of high purity fused quartz, and able to fully support the polycrystalline silicon. After loading the polycrystalline silicon into the reactor chamber, the reactor chamber is evacuated by drawing a vacuum.

The polycrystalline silicon and the metallic contaminants on and near the surface thereof are then exposed to the gas-phase halogen etchant. The metallic contaminants underlying the original surface of the polycrystalline silicon are exposed to the gas phase halogen etchant by direct exposure after the overlying silicon is etched away.

The gas-phase halogen etchant preferably comprises a halogen plasma. Without being bound by theory, the high energy ionic and/or free radical halogen moieties present in the halogen plasma react directly with the metallic contaminants to which they are exposed and form metal halides. The composition of the halide formed is primarily controlled by free energy considerations, temperature and pressure. Table I shows the most energetically favored metal halides formed between various halogen free radicals and a variety of metallic contaminants of interest.

TABLE I

Energetically Favored Metal Halides Formed From Halogen Plasmas*

|    | F        | Cl         | Br         |
|----|----------|------------|------------|
| Na | NaF      | NaCl       | NaBr       |
| K  | KF       | KCl        | KBr        |
| Ca | $CaF_2$  | $CaCl_2$   | $CaBr_2$   |
| Ti | $TiF_4$ (g) | $TiCl_4$ (g) | $TiBr_4$ (g) |
| Cr | $CrF_5$ (g) | $CrCl_4$ (g) | $CrBr_4$ (g) |
| Fe | $FeF_3$  | $FeCl_3$ (g) | $FeBr_3$   |
| Co | $CoF_3$  | $CoCl_3$ (g) | $CoBr_2$   |
| Ni | $NiF_2$  | $NiCl_2$   | $NiBr_2$   |
| Cu | $CuF_2$  | $CuCl_2$   | $CuBr_3$ (g) |

*Based on free radical halogens reacting with about $1 \times 10^{-6}$ to about $1 \times 10^{-9}$ moles of contaminants. The halogen plasma is energized from a source-gas comprising 1 mole of halogen gas in 10 moles of argon at 10 torr (1,332 Pa) and at temperatures ranging from about 25° C. to about 300° C.

The halogen plasma is generated from a source-gas which includes a halogen gas or a halogen-containing compound gas. Fluorine, chlorine, bromine and iodine are preferred halogen gasses with fluorine and chlorine being more preferred. Fluorine is generally the most reactive of the halogen gasses and is a most preferred halogen gas with respect to forming metal halides. Bromine is a preferred halogen gas for forming a halide with calcium and chromium contaminants. Preferred halogen-containing compound gasses include chlorocarbons, fluorocarbons, chlorofluorocarbons, and halogenated hydrocarbons.

The source-gas may be in the form of a pure halogen or halogen-containing compound gas, a mixture of halogen or halogen-containing compound gasses, or a mixture of one or more halogen or halogen-containing compound gasses with one or more non-halogenated gases such as an inert gas and/or oxygen. The various combination of gases may be used either simultaneously or sequentially. Helium or argon may be used separately or in combination as the inert gas constituent. Oxygen is preferably included when the halogen-containing compound gas contains carbon (e.g. halogenated hydrocarbons, chlorocarbons, fluorocarbons, etc.). Oxygen is also effective in combination with a halogen gas for forming chromium oxo-halides, particularly at higher concentrations of chromium contaminants.

The source-gas is preferably a mixture of one or more halogen gasses or halogen-containing compound gasses with an inert gas. The total concentration of halogen gasses or halogen-containing compound gasses in the mixture preferably ranges from about 1% to about 15% by volume. This range of halogen concentrations is sufficient to fully react with the amount of metallic contaminants typically present on the surface of polycrystalline silicon. However, the concentration of halogen gas or halogen-containing gas compound in the source-gas is not narrowly critical. Although the concentration affects the reactivity of the halogen plasma, a more or less reactive plasma may be used provided the exposure time is sufficient to react the metallic contaminants.

The halogen plasma may be formed by the application of electromagnetic energy to the source-gas, such methods being well known to those of ordinary skill in the art. Preferably, the halogen plasma is generated by energizing the source-gas in a microwave field having a frequency of from about 1.0 GHz to about 4.0 GHz. However, the halogen plasma could alternatively be generated at other electromagnetic frequencies, as a RF plasma or UV plasma. Commercial units for microwave induced plasmas are available from Plasmatic Systems (North Brunswick, N.J.). Units for RF generator induced plasma are commercially available from Technics, Inc. (Dublin, Calif.). Other commercial sources of plasma etching units and supplies include Lam Research Corp. (Fremont, Calif.) and Applied Science and Technology, Inc (Woburn, Mass.).

The halogen plasma is preferably a low pressure plasma (ie, a plasma in which the temperature of the bulk of the source-gas is not in thermal equilibrium with the temperature of the ionic and/or free radical halogen moieties). Although the low pressure plasma results in only minimal heating of the polycrystalline silicon, the lower pressures favor volatilization of the metal halides at lower temperatures. The pressure of the source-gas from which the low pressure plasma is generated most preferably ranges from about 0.01 torr (~1 Pa) to about 100 torr (~$1 \times 10^4$ Pa).

While a halogen plasma is preferred, a halogen gas or halogen-containing compound gas which is not energized into a plasma state will also react with metallic contaminants to form metal halides. The use of non-energized (ie, non-plasmatic) halogen gasses affords greater flexibility with respect to the type of reactor designs which can be employed. For example, a non-energized halogen gas may be reacted with metallic contaminants in a heated tubular reactor to facilitate better control over the reaction temperature.

Hence, the gas-phase halogen etchant alternatively comprises a pure halogen or halogen-containing compound gas. A mixture of halogen or halogen-containing compound gasses, or a mixture of one or more halogen or halogen-containing compound gasses with one or more non-halogenated gases such as an inert gas and oxygen could also be used. The preferred halogen gasses, halogen-containing compound gas, and non-halogenated gasses are the same as those gasses preferred for halogen plasma source-gas, as set forth above. The preferred mixture of gasses and concentration thereof are also the same as for the source-gas.

The temperature of the halogen gas is preferably sufficient to allow the halogen gas to react with metallic contaminants to form solid or gaseous metal halides, and most preferably ranges from about 25° C. to about 900° C. The surface of the polycrystalline silicon is preferably heated after the halogen gas has been introduced into the reactor chamber, to facilitate formation of the metal halide rather than diffusion of the metallic contaminants into the bulk of the polycrystalline silicon. Based upon free energy considerations, metal halides form readily between the metallic contaminants of interest and halogen gasses or halogen-containing compound gasses at temperatures greater than about 25° C. However, the metal halides formed at room temperature are usually solid metal halides. Volatilization of the solid metal halides generally requires significantly higher temperatures, as discussed below.

Although the present invention is generally directed to removing all types of metallic contaminants from the surface of polycrystalline silicon, it is particularly directed to removing alkali, alkaline earth, and transition metals therefrom. A significant amount of transition metal contaminants such as iron, chromium, cobalt, nickel, copper or titanium are suspected of being deposited on chunk polycrystalline silicon. Alkali metal contaminants such as sodium and potassium appear to be most prevalent on granular polycrystalline silicon. Each of these contaminants, however, as well as others such as calcium, are present on both chunk and granular polycrystalline silicon, typically at concentration levels ranging from about $10^{-9}$ to about $10^{-6}$ moles.

Due to handling of the polycrystalline silicon, the concentration of metallic contaminants tends to be greater at and near the surface of the polycrystalline silicon than within the bulk of the polycrystalline silicon. Greater levels of metallic contaminants generally exist to depths ranging from about 1 µm to about 50 µm below the surface.

The polycrystalline silicon is preferably etched by the gas-phase halogen etchant until the bulk concentration of the polycrystalline silicon is reached. The surface of polycrystalline silicon is exposed to the gas-phase halogen etchant for a period of time sufficient to etch from about 1 µm to about 50 µm. The exact exposure time is not narrowly critical and is related to the reactivity of the gas-phase halogen etchant, the type and concentration of metallic contaminants and the desired surface temperature of the polycrystalline silicon. When the gas-phase halogen etchant is a halogen plasma, the polycrystalline silicon is preferably exposed to the halogen plasma for a period of fifteen minutes or less. Exposure times of several minutes or less are more preferred. When the gas-phase halogen etchant is a halogen gas or a halogen-containing compound gas, the exposure time preferably ranges from about 1 minute to about 20 minutes, and most preferably from about 1 minute to about 3 minutes.

The metal halides, once formed, are removed from the polycrystalline silicon by volatilizing them into an atmosphere adjacent to the surface of the polycrystalline silicon and then purging them from this atmosphere.

Volatilization of metal halides is dependent upon the temperature of the surface of the polycrystalline silicon and the pressure of the atmosphere in which the polycrystalline silicon resides. If the temperature of the surface of the polycrystalline silicon is the same as or greater than the volatilization temperature of a metal halide at a given pressure, then the metal halide will volatilize. Conversely, if the temperature of the surface of the polycrystalline silicon is less than the volatilization temperature at a given pressure, then the metal halide will either not volatilize, or if already volatilized, will redeposit onto the surface of the polycrystalline silicon. Table II shows the temperature and pressure at which a variety of metal halides of interest will volatilize.

Without being held to theory, volatilization generally occurs as a sublimation process, but may also occur as an evaporation process.

The temperature of the surface of the polycrystalline silicon is, in combination with pressure, preferably controlled to facilitate volatilization of the metal halides. When a halogen plasma is used as the gas-phase halogen etchant, the halogen etchant heats up the surface of the polycrystalline silicon. The degree of plasma-heating will depend on the particular nature of the halogen plasma, and upon the duration of exposure to the plasma. Heating with the halogen plasma requires coordination with other process parameters such as the reactivity of the halogen plasma. Auxiliary heating means, such as resistive heating or other means known in the art, may also be used to heat the surface of the polycrystalline silicon as a supplement to plasma heating. When the gas-phase halogen etchant comprises a halogen gas or a halogen-containing compound gas, the surface of the polycrystalline silicon may be heated by the gas itself in a heated tubular reactor and/or by using auxiliary heating.

The metal halides are preferably volatilized in the reaction chamber in which they are formed. In this embodiment, the temperature of the surface of the polycrystalline silicon should be sufficient, at the pressure of the reaction chamber, to volatilize the metal halides and to prevent redeposition of the volatilized metal halides onto the surface of the polycrystalline silicon. When metallic contaminants such as Na, K, Ca, Ti, Cr, Fe, Co, Ni or Cu are reacted with the gas-phase halogen etchant to form metal halides, the temperature of the surface of the polycrystalline silicon in the reaction chamber is preferably greater than about 250° C. at a pressure less than about 1300 Pa.

TABLE II

Volatilization Temperatures and Pressures of Some Metal Halides

| | | °C. at 1 torr ~130 Pa | °C. at 10 torr ~1300 Pa | °C. at 100 torr ~1.3 × $10^4$ Pa |
|---|---|---|---|---|
| Na | NaF | 510 | 550 | 580 |
|  | NaCl | 360 | 480 | 500 |
|  | NaBr | 280 | 300 | 400 |
| K | KF | 450 | 470 | — |
|  | KCl | 400 | 430 | — |
| Ca | $CaF_2$ | 850 | 900 | — |
|  | $CaCl_2$ | 430 | 530 | — |
|  | $CaBr_2$ | — | 450 | — |
| Ti | $TiF_4$ | 25 | 25 | — |
|  | $TiCl_4$ | 25 | 25 | — |
|  | $TiBr_4$ | 25 | 25 | — |
| Cr | $CrF_5$ | 25 | 25 | — |
|  | $CrCl_3$ | 25 | 25 | — |
| Fe | $FeF_3$ | 225 | 275 | 275 |
|  | $FeCl_3$ | 25 | 25 | 75 |
|  | $FeBr_3$ | 225 | 275 | 325 |
| Co | $CoF_3$ | 480 | 500 | 580 |
|  | $CoCl_2$ | 200 | 250 | 270 |
|  | $CoCl_3$ | 25 | 25 | 25 |
| Ni | $NiF_2$ | 475 | 525 | — |
|  | $NiCl_2$ | 250 | 300 | — |
|  | $NiBr_2$ | 225 | 275 | — |
| Cu | $CuF_2$ | 375 | 425 | 425 |
|  | $CuCl_2$ | 275 | 325 | 375 |
|  | $CuBr_3$ | 25 | 25 | 25 |

As seen in Table II, however, the halides of some metallic contaminants have relatively high volatilization temperatures, even at very low pressures. For example, $CaF_2$ requires a temperature of about 850° C. to volatilize at a pressure of about 130 Pa. Although such temperatures are attainable using auxiliary heating and/or tubular reactors known in the art, it may not be desirable to heat the surface of the polycrystalline silicon to such high temperatures. Higher temperatures will generally increase the diffusion rate of metallic impurities from the surface into the bulk of the polycrystalline chunks or granules. In some cases, therefore, it may be less preferable to volatilize the metal halides with such high volatilization temperatures in the reaction chamber.

In an alternative embodiment of the invention, at least some metal halides are volatilized outside the reaction chamber. For example, metal halides which are not volatilized in the reaction chamber may be volatilized in a crystal puller during a subsequent crystal pulling step. In the CZ crystal puller, the polycrystalline silicon is melted at temperatures greater than about 1410° C. and at pressures ranging from about 10 torr to about 20 torr (about 1300 Pa to about 2600 Pa). Such temperatures and pressures are, in combination, sufficient to volatilize even calcium halides.

Preferably, the metal halides volatilized in the reaction chamber include the halides of Na, K, Fe, Ni, or Cu. In such a situation, the temperature of the surface of the polycrystalline silicon in the reaction chamber preferably ranges from about 200° C. to about 500° C. with the pressure of the reaction chamber being less than about 130 Pa.

Once volatilized, either within or outside of the reactor chamber, the metal halides are purged from the atmosphere adjacent to the surface of the polycrystalline silicon. The metal halides are preferably purged away from the surface of the polycrystalline silicon as soon as they are volatilized, to minimize redeposition onto the polycrystalline surface.

The purging can be effected by the action of the gas-phase halogen etchant as it reacts with the metallic contaminants and circulates over the polycrystalline silicon. In such a dynamic reaction system, about 0.25 cm$^3$ of halogen gas or halogen-containing compound gas is required to react the metallic contaminants at typical contamination levels. A purge gas flow rate of about 10 standard liters per minute of a gas mixture of which the halogen gas or halogen-containing compound gas constitutes about 1% to about 10% by volume is generally sufficient to supply the halogen reactant for metallic contaminant concentrations ranging from about $10^{-9}$ to about $10^{-6}$ moles. Higher concentrations of halogen gas or pure halogen gasses may also be used in such a dynamic system. Additionally or alternatively, the metal halides can be purged after the reaction, preferably with an inert gas. When the purging is done using an inert gas, the flow rate thereof is not critical. Purging the reaction chamber also serves to cool the polycrystalline silicon. However, to prevent redeposition of metal halides onto the surface of the polycrystalline silicon, the surface should be cooled only after the volatile metal halides have been completely purged.

It is also desirable, in the preferred embodiment, to prevent deposition of the metal halides on the reactor chamber or elsewhere within the purge gas flow path, to avoid accumulation of such contaminants over time. The exposed surfaces of the reactor chamber and other portions of the purge gas flow path are preferably heated to a temperature sufficient to prevent deposition of the metal halides thereon. Additionally, the metal halides may be collected in a cold trap located in the purge gas flow path downstream of the reactor chamber. To be effective, the cold trap preferably comprises a rough surface, fins, and/or other means for obtaining a large surface area over which the purge gas can flow, and is preferably maintained at a temperature sufficiently low to allow deposition of the metal halides. In addition to the cold trap, the purged gas is also preferably passed through a halogen scrubber and/or filter.

Once cooled, the cleaned polycrystalline silicon is removed from the reactor chamber and is stored in a high purity Czochralski type fused quartz crucible with a minimum of handling and storage. The type of crucible commercially available from GE Quartz (Cleveland, Ohio), Toshiba Ceramics America (Hilsboro, Oreg.), and QSI Quartz Scientific Inc (Fairport Harbor, Ohio) is suitable. In addition, the equipment used to handle and process the cleaned polycrystalline silicon is selected to eliminate exposure to metallic contaminants. Tongs used to transfer the polycrystalline silicon to the crucible are preferably constructed of silicon or quartz. This preferred procedure may be repeated if necessary, until a sufficient amount of cleaned polycrystalline silicon is obtained for growing a single crystal silicon ingot.

To eliminate possible recontamination during transfer or storage, the cleaned polycrystalline silicon is preferably immediately charged to a fused quartz crucible and melted to prepare a mass of molten silicon for use in producing a single crystal silicon ingot by the Czochralski method.

The CZ melt down procedures may need to account for the fact that polycrystalline silicon cleaned with a halogen plasma is more reactive than uncleaned polycrystalline silicon. Without being bound to any theory, it is suspected that cleaning the surface of polycrystalline chunks or granules with a halogen plasma may activate some surface sites for adsorption of either metals or carbon. The rate of melting polycrystalline silicon is preferably empirically determined to provide single crystal silicon ingots with reduced contaminant content, metallic or otherwise, relative to single crystal silicon ingots which have not been cleaned with a halogen plasma.

The process of the present invention can be used to clean a large variety of metallic contaminants, and can be used in place of, or supplemental to conventional cleaning methods known in the art. The following example is intended to be exemplary of the analysis used to determine the preferred process parameters for removing a particular metallic contaminant. A similar analysis could be employed by a person of ordinary skill in the art for other metallic contaminants.

EXAMPLE 1

Iron is typically present on the surface of polycrystalline silicon, and particularly on the surface of chunk polycrystalline silicon. Thermodynamic and equilibria analyses are performed to determine the preferred process parameters for removing iron from the surface of polycrystalline silicon. Commercial software is available to perform these analyses with quickly and with high accuracy. *HCS Chemistry for Windows* (Outokumpu Research, Finland) is exemplary of such a commercial software.

Gibbs free energy analyses are done to determine potential metal halide reaction products when iron reacts with a variety of gaseous halogen molecules, ions, or free radicals (e.g. $F_2$, $F^-$ or F). Similar analyses could be done to determine the values for other halogen moieties.

Based upon the Gibbs free energy values, the most prevalent metal halides for a particular halogen moiety are determined. As seen in Table I, the most stable iron halides formed are $FeF_3$, $FeCl_3(g)$ and $FeBr_3$ for fluorine, chlorine and bromine free radicals, respectively.

Once the most prevalent metal halide has been determined for the various gas-phase halogen etchant systems under consideration, equilibrium analyses are performed to determine the range of temperatures and pressures at which the metal halide will volatilize. FIGS. 1 and 2 show equilibria data related to $FeCl_3$ and $FeCl_2$ at 10 torr (~1300 Pa) and 100 torr (~1.3×10⁴ Pa), respectively. Specifically, FIGS. 1 and 2 show, at their respective pressures, the concentration of halide products, in moles of solid or gas, as a function of temperature for the system in which free radical halogens react with about $1×10^{×6}$ to about $1×10^{×9}$ moles of contaminants, and in which the halogen plasma is energized from a source-gas comprising 1 mole of halogen gas in 10 moles of argon.

Comparison of FIGS. 1 and 2 demonstrates the pressure dependence of the volatilization temperature for this system. FIG. 1 shows that, at 10 torr, all of the metal halides are in gaseous form at temperatures as low as 25° C. In contrast, FIG. 2 shows that at 100 torr, solid $FeCl_3$ and $FeCl_2$ volatilize at about 75° C.

This thermodynamic and equilibria data is determined for the various contaminants present on the surface of the polycrystalline silicon. These contaminants are then removed according to the method of the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention.

We claim:

1. A process for removing metallic contaminants from the surface of chunk or granular polycrystalline silicon comprising:
   a. exposing the metallic contaminants and the polycrystalline silicon to a gas-phase halogen etchant in a reaction chamber, the halogen etchant reacting with the exposed metallic contaminants to form metal halides;
   b. volatilizing the metal halides of at least some metallic contaminants into an atmosphere adjacent to the surface of the polycrystalline silicon;
   c. purging the volatilized metal halides from the atmosphere; and
   d. volatilizing at least some of the metal halides not volatilized in the reaction chamber in a crystal puller during a subsequent crystal pulling step.

2. The process as set forth in claim 1 wherein the gas-phase halogen etchant comprises a halogen plasma.

3. The process as set forth in claim 2 wherein the halogen plasma is a low pressure halogen plasma.

4. The process as set forth in claim 2 wherein the halogen plasma is generated by energizing a plasma source-gas comprising a halogen gas or a halogen-containing compound gas in a microwave field having a frequency ranging from about 1.0 GHz to about 4.0 GHz.

5. The process as set forth in claim 2 wherein the metallic contaminants include Na, K, Ca, Ti, Cr, Fe, Co, Ni or Cu, and wherein the halogen plasma is generated by energizing a source-gas comprising a halogen gas or a halogen-containing compound gas at a pressure ranging from about 1 Pa to about 1.3×10⁴ Pa.

6. The process as set forth in claim 2 wherein the halogen plasma is generated by energizing a source-gas comprising a gas selected from the group consisting of fluorine, chlorine, bromine, iodine, chlorocarbons, fluorocarbons, chloroflourocarbons, and halogenated hydrocarbons.

7. The process as set forth in claim 1 wherein the gas-phase halogen etchant comprises a halogen gas or a halogen-containing compound gas.

8. The process as set forth in claim 7 wherein the halogen gas or halogen-containing compound gas is at a temperature sufficient to react with metallic contaminants to form metal halides.

9. The process as set forth in claim 7 wherein the metallic contaminants include Na, K, Ca, Ti, Cr, Fe, Co, Ni or Cu, and wherein the temperature of the halogen gas or halogen-containing compound gas ranges from about 25° C. to about 900° C.

10. The process as set forth in claim 7 wherein the gas-phase halogen etchant is a gas selected from the group consisting of fluorine, chlorine, bromine, iodine, chlorocarbons, fluorocarbons, chloroflourocarbons, halogenated hydrocarbons, and boron trichloride.

11. The process as set forth in claim 1 wherein the metal halides volatilized in the reaction chamber include the halides of Na, K, Fe, Ni, or Cu, wherein the temperature of the surface of the polycrystalline silicon in the reaction chamber ranges from about 200 ° C. to about 500° C. and wherein the pressure of the reaction chamber is less than about 130 Pa.

12. The process as set forth in claim 1 wherein the surface of the polycrystalline silicon is etched by the gas-phase halogen etchant at least until the concentration of metallic contaminants at the etched surface is about equal to the concentration of metallic contaminants within the bulk of the polycrystalline silicon.

13. The process as set forth in claim 1 wherein the thickness of the polycrystalline silicon etched by the gas-phase halogen etchant ranges from about 1 μm to about 50 μm.

14. A process for removing metallic impurities from the surface of chunk or granular polycrystalline silicon, the process comprising:
   a. exposing the metallic contaminants and the polycrystalline silicon to a low pressure halogen plasma which reacts with the exposed metallic contaminants to form metal halides and etches the polycrystalline silicon, the halogen plasma being generated in a reaction chamber by energizing a source-gas comprising a halogen gas or a halogen-containing compound gas in a microwave field having a frequency ranging from about 1.0 GHz to about 4.0 GHz, the polycrystalline silicon being etched by the halogen etchant until the bulk polycrystalline silicon is reached;
   b. volatilizing the metal halides into an atmosphere adjacent to the surface of the polycrystalline silicon, the halides of at least some metallic contaminants being volatilized in the reaction chamber, the metal halides not volatilized in the reaction chamber being volatilized in a crystal puller during a subsequent crystal pulling step, wherein the temperature of the surface of the polycrystalline silicon is greater than about 250° C. and the pressure of the reaction chamber is less than about 1300 Pa; and
   c. purging the volatilized metal halides from the atmosphere.

15. The process as set forth in claim 14 further comprising the step of purging the reaction chamber with an inert gas.

16. A process for removing metallic contaminants from the surface of chunk or granular polycrystalline silicon prior to use thereof for production of single crystal silicon, the process comprising:
   a. exposing the metallic contaminants and the polycrystalline silicon to a halogen plasma which reacts with the exposed metallic contaminants to form metal halides;
   b. volatilizing the metal halides into an atmosphere adjacent to the surface of the polycrystalline silicon; and c. purging the volatilized metal halides from the atmosphere.

17. The process as set forth in claim 16 wherein the halogen plasma is generated by energizing a plasma source-gas comprising a halogen gas or a halogen-containing compound gas in a microwave field having a frequency ranging from about 1.0 GHz to about 4.0 GHz.

18. The process as set forth in claim 16 wherein the halogen plasma is generated by energizing a plasma source-gas comprising a halogen gas or a halogen-containing compound gas, the plasma source-gas being at a temperature ranging from about 25° C. to about 300° C.

19. The process as set forth in claim 16 wherein the temperature of the surface of the polycrystalline silicon in the reaction chamber ranges from about 200° C. to about 500° C. and wherein the pressure of the reaction chamber is less than about 130 Pa.

20. The process as set forth in claim 16 wherein the halogen plasma is a low pressure halogen plasma.

21. The process as set forth in claim 16 wherein the halogen plasma is generated by energizing a plasma source-gas comprising a halogen gas or a halogen-containing compound gas at a pressure ranging from about 1 Pa to about $1.3 \times 10^4$ Pa.

22. The process as set forth in claim 16 wherein the halogen plasma is generated by energizing a plasma source-gas comprising a gas selected from the group consisting of fluorine, chlorine, bromine, iodine, chlorocarbons, fluorocarbons, chlorofluorocarbons, and halogenated hydrocarbons.

23. The process as set forth in claim 16 wherein the metallic contaminants include Na, K, Ca, Ti, Cr, Fe, Co, Ni or Cu, and wherein the halogen plasma is generated by energizing a source-gas comprising a halogen gas or a halogen-containing compound gas at a pressure ranging from about 1 Pa to about $1.3 \times 10^4$ Pa.

24. The process as set forth in claim 16 wherein the surface of the polycrystalline silicon is etched by the halogen plasma at least until the concentration of metallic contaminants at the etched surface is about equal to the concentration of metallic contaminants within the bulk of the polycrystalline silicon.

25. The process as set forth in claim 16 wherein the surface of the polycrystalline silicon is etched by the halogen plasma at least until the thickness of polycrystalline silicon removed therefrom ranges from about 1 μm to about 50 μm.

26. The process as set forth in claim 16 wherein the metallic contaminants and the polycrystalline silicon are exposed to the halogen plasma in a reaction chamber, and wherein the metal halides are volatilized in the reaction chamber.

27. The process as set forth in claim 26 wherein the temperature of the surface of the polycrystalline silicon is sufficient, at the pressure of the reaction chamber, to volatilize the metal halides.

28. The process as set forth in claim 26 wherein the metallic contaminants include Na, K, Ca, Ti, Cr, Fe, Co, Ni or Cu; wherein the temperature of the surface of the polycrystalline silicon in the reaction chamber is greater than about 250° C.; and wherein the pressure is less than about 1300 Pa.

29. The process as set forth in claim 16 wherein the metallic contaminants and the polycrystalline silicon are exposed to the halogen plasma in a reaction chamber, the metal halides of at least some metallic contaminants are volatilized in the reaction chamber and the metal halides not volatilized in the reaction chamber are volatilized in a crystal puller during a subsequent crystal pulling step.

30. A process for preparing a mass of molten silicon from polycrystalline silicon for use in producing a single crystal silicon ingot by the Czochralski method, the process comprising:

a. removing metallic contaminants from the surface of chunk or granular polycrystalline silicon by exposing the metallic contaminants to a halogen plasma which reacts with the exposed metallic contaminants to form metal halides; volatilizing the metal halides into an atmosphere adjacent to the surface of the polycrystalline silicon; and purging the volatilized metal halides from the atmosphere;

b. charging the cleaned polycrystalline silicon to a crucible; and c. melting the polycrystalline silicon.

* * * * *